July 5, 1932.  L. JACKSON  1,866,109
HEATING RANGE
Filed Dec. 13, 1930
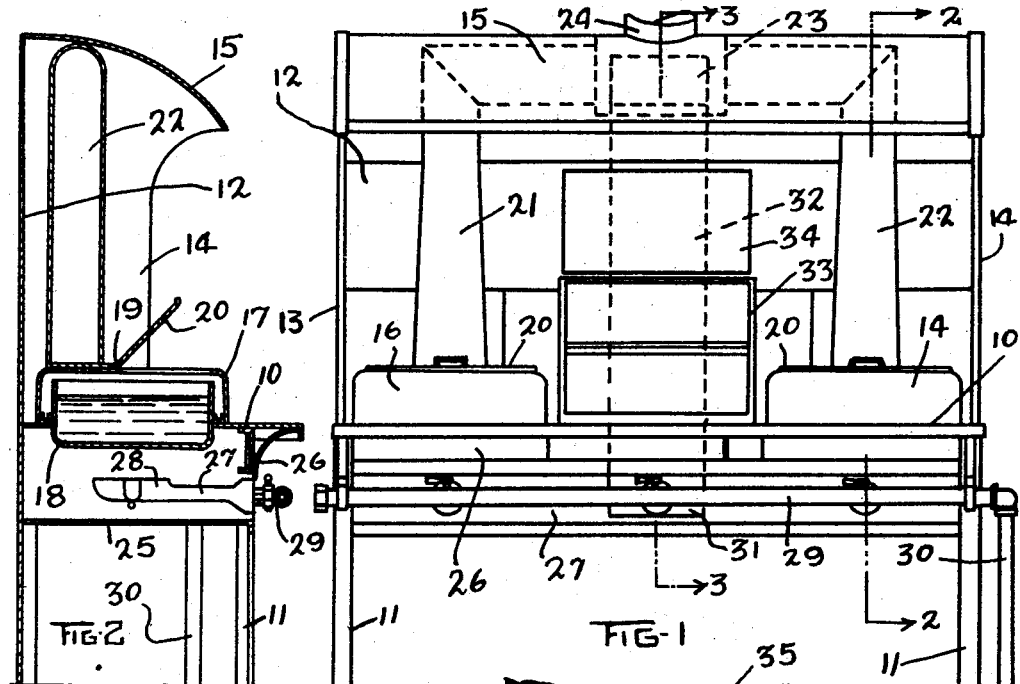
INVENTOR
L. Jackson
By
E.J. Fethurstonhaugh
ATTORNEY.

Patented July 5, 1932

1,866,109

UNITED STATES PATENT OFFICE

LOUISA JACKSON, OF TORONTO, ONTARIO, CANADA

HEATING RANGE

Application filed December 13, 1930, Serial No. 502,083, and in Canada April 4, 1930.

This invention relates to a heating range as described in the present specification and illustrated in the accompanying drawing which forms part of same.

The invention consists essentially of the means employed for exhausting the fumes, greases, and odours and for maintaining the food stuffs in edible condition as pointed out in the claim for novelty following the description of an acceptable form of the invention.

The objects of this invention are to construct a heating range suitable for use in fried fish and potato shops where the odour given off by the hot fat and frying fish is offensive to the patrons and pervades the entire premises being carried by the steam and fumes and settling and permeating the clothing of the cooks and employees as well as adhering to the walls and furniture of the premises and which cannot be dissipated in the ordinary way of cleaning, thus causing the proprietor loss in patronage and consequent diminution in business and a blot on the reputation of the place on the grounds of uncleanliness; to furnish a heating range inexpensive to manufacture and with low operating costs, sanitary in use and capable of producing the cooked comestibles for consumption hot and free from grease and edible and generally to provide a heating range of great utility to the general public and to the particular business involved.

In the drawing, Figure 1 is a front elevational view of the invention.

Figure 2 is a vertical sectional view taken on the line 2—2 in Figure 1.

Figure 3 is a vertical sectional view taken on the line 3—3 in Figure 1.

Figure 4 is a fragmentary sectional detail of the oven showing the water container.

Figure 5 is a perspective view of the hot air flue showing the steam flues and stack broken away.

Figure 6 is a perspective view of one of the fat pan casings.

Like numerals of reference indicate corresponding parts in the various figures.

The numeral 10 indicates a flat stove top supported on the four legs 11. The two rear legs extend upwardly and form a supporting means for the back 12 which together with the sides 13 and 14 form supporting members for the canopy 15.

The fat pan casings 16 and 17 are adapted to completely close in the fat pans 18 and are detachably secured on the stove top. Each of these casings have a lid 20 hinged at 19 at the top and the aperture 18a at the rear and in which the flues 21 are adapted to be inserted and detachably secured therefrom and extend upwardly and turn at right angles into the box 23 situated under the canopy 15.

The fat pans 18 are sunk to a part of their depth in the stove top 10 and the casings 16 and 17 entirely enclose the top of the fat pans so that the only entrance to the pans are through the lids 20 of the casings.

The box 23 forms a junction for the flues 21 and 22 and the smoke stack 24 which is suitably secured in the top of said box and extends through the canopy 15 into the usual house chimney.

Below the stove top 10 the shelf 25 is secured which together with the short front wall 26 and the back 12 forms the chamber 27 in which are situated the gas burners 28 which are supplied with gas from the common pipe 29 connected to the main 30. The waste heat from the gas rings is taken away through the hole 31 cut in the back 12 and into the flue 32 which extends upwardly into the box 23 where it escapes into the stack.

The oven 33 is situated between the casings 16 and 17 and consists of a box like structure having a lid 34 hinged to the top and lifting upwardly. The tray 35 consists of a perforated plate covering the open top of a shallow container 36, which is carried on the slides 37 secured to the sides of the oven. It will therefore be seen that the grease draining off the fish laying on the perforated plate will drain off into the container 36 thus leaving the fish free from the objectionable grease.

The bottom of the oven consists of a perforated plate 37 resting on the edges of an opening cut in the stove top 10. Under this opening is a tray 38 sliding on the runners 39 and containing water which is heated by one of the gas burners 28. The tray may be removed from the range through an opening provided in the short front wall 26 which is covered by the sliding door 40.

In the operation of this invention the waste heat from the gas burners 28 is taken out through the rear wall 12 up the flue 32 and into the box 23 where it escapes through the stack pipe 24 to the chimney and the steam and odour from the pans 18 are taken through the flues 21 and 22 of the casings 16 and 17. The heated gases travelling through the stack pipe have the effect of sucking all the steam through the flues and into the box 23 where it escapes through the stack to the chimney. It will therefore be seen that very little steam from the boiling fat can escape into the atmosphere as even when the lids of the casings are lifted there is still enough suction to clear away the steam and any that escapes and collects under the canopy 15 is immediately drawn into the stack through the holes 41 in the box 23.

The oven 33 is heated by the steam rising from the container or tray 38 which fills the oven and keeps the comestibles therein in a hot although moist condition and ready for serving to the patrons.

It will thus be seen that all the odour and fumes are taken away directly to the chimney there being no chance of the premises being pervaded by the offensive odour so noticeable in the usual place of business and the comestibles are served to the patrons in a sanitary and appetizing condition. The whole stove being so constructed that it can all be taken to pieces and cleaned in a very short time, eliminates all risk of contaminating the food being prepared.

What I claim is:

A heating range comprising a frame supported by standards and having a flat stove top, detachable casings secured to said stove top and having fat pans therein, an oven situated between said casings on said stove top and having a perforated plate forming the bottom and a hinged lid for the top, a container having a perforated plate forming a tray slidably arranged in said oven, flues detachably connected to said casings and extending upwardly therefrom and connected to a main flue having an outlet and suitably supported by said frame.

Signed at Toronto, Canada, this 15th day of October, 1930.

LOUISA JACKSON.